United States Patent [19]

Abe et al.

[11] Patent Number: 5,196,250
[45] Date of Patent: Mar. 23, 1993

[54] OPTICAL INFORMATION RECORDING MEDIUM

[75] Inventors: Michiharu Abe; Masaakira Umehara, both of Yokohama, Japan

[73] Assignee: Ricoh Company, Ltd., Tokyo, Japan

[21] Appl. No.: 732,038

[22] Filed: Jul. 18, 1991

[30] Foreign Application Priority Data

Jul. 20, 1990 [JP] Japan .................................. 2-190407

[51] Int. Cl.$^5$ .............................................. B32B 3/00
[52] U.S. Cl. .................................... 428/64; 428/65; 428/457; 428/913; 346/76 L; 346/135.1; 369/283; 369/288; 430/270; 430/945
[58] Field of Search ............ 428/64, 65, 457, 913; 346/76 L, 135.1; 369/283, 288; 430/270, 945

[56] References Cited

U.S. PATENT DOCUMENTS 3,947,337  3/1976  Peters, Jr. ............................. 430/309
4,954,841  9/1990  Ichihara ............................. 346/135.1

*Primary Examiner*—Patrick J. Ryan
*Assistant Examiner*—Elizabeth Evans
*Attorney, Agent, or Firm*—Cooper & Dunham

[57] ABSTRACT

An optical information recording medium is composed of a substrate and a recording layer which includes a diarylpolyene compound of formula (I):

$$A^1-(C=C)_n-A^2 \quad \text{(I)} \\ \quad\;\; |\;\; | \\ \quad\;\; R^1\; R^2$$

wherein $A^1$ and $A^2$ each independently represent an aryl group which may have a substituent; $R^1$ and $R^2$ each represent hydrogen, a halogen or an alkyl group having 1 to 4 carbon atoms; and n is an integer of 2 or more.

21 Claims, 1 Drawing Sheet

OPTICAL INFORMATION RECORDING MEDIUM

BACKGROUND OF THE INVENTION

1. Field of the Invention

The present invention relates to an optical information recording medium capable of recording and reproducing information on an optical disk or card or the like by using a focused laser beam.

2. Description of the Prior Art

Conventionally, as organic recording materials for use with a semiconductor laser, which can be used in practice, those for use with a laser beam having a wavelength of 750 to 850 nm are commonly known. Representative examples of such recording materials comprise a substrate and a thin film layer of a polymethine dye such as a cyanine dye, a phthalocyanine dye, a naphthoquinone dye, a naphthalocyanine dye, or a squarylium dye, formed on the substrate, as described in "Organic Recording Materials for Optical Disks" by M. Abe, one of the inventors of the present invention, compiled by the Japanese Research Association for Organic Electronics Materials, published by Bunshin Publishing Company (1989). However, these dyes lack in the light absorption or light reflection properties in the short wavelength region of 400 to 500 nm, so that there is a limitation in utilizing these dyes for high density recording.

SUMMARY OF THE INVENTION

Accordingly, an object of the present invention is to provide, with due consideration of the drawbacks of such conventional materials, an optical information recording medium from which optical pick up is possible using a laser beam with a wavelength of 300 nm to 500 nm, with which high density recording is possible, by the focusing of the laser beam being made fine. The shorter the wavelength of the focused laser beam, the finer the focusing possible, so that a recording density of 2.5 to 7 times the recording density currently obtained at a wavelength of 800 nm can be attained.

The above object of the present invention can be achieved by an optical information recording medium which comprises a substrate and a recording layer formed thereon, comprising a diarylpolyene compound having general formula (I):

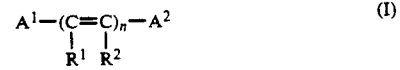

wherein $A^1$ and $A^2$ each independently represent an aryl group which may have a substituent; $R^1$ and $R^2$ each represents hydrogen, a halogen or an alkyl group having 1 to 4 carbon atoms; and n is an integer of 2 or more.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
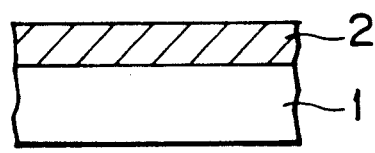
FIG. 1 to FIG. 6 are views for explaining the layer structures of the optical information recording media of the present invention.

In the above general formula (I) of a diarylpolyene compound, the aryl groups represented by $A^1$ and $A^2$ are generally the same, but they may be different. $R^1$ and $R^2$ generally represent hydrogen, but may be a halogen atom or an alkyl group having 1 to 4 carbon atoms, for example, a methyl group and an ethyl group, and n is an integer of 2 or greater, but in consideration of the absorption wavelength an integer in the range from 3 to 12 is particularly preferable.

Examples of the aryl groups which are represented by $A^1$ and $A^2$ include a phenyl group, a naphthyl group, an anthracenyl group, and a phenanthrenyl group, each of which may have a substituent. Examples of the above-mentioned substituent include a halogen, and an alkyl group having 1 to 4 carbon atoms, such as a methyl group and an ethyl group.

Examples of the maximum absorption wavelengths for the case where $A1 = A2$, and $R1 = R2 = $ a hydrogen atom are given in Table 1.

TABLE 1

| n | 2 | 3 | 4 | 5 | 6 | 7 | 8 | 9 | 10 | 11 | 12 |
|---|---|---|---|---|---|---|---|---|---|---|---|
| $A_1 = A_2$ | | | | | | | | | | | |
| Phenyl group | 334 nm | 358 nm | 384 nm | 403 nm | 420 nm | 435 nm | 449 nm | 462 nm | 474 nm | 485 nm | 495 nm |
| 1-naphthyl group | 362 | 381 | 406 | 422 | 436 | 451 | 455 | 478 | 490 | 501 | 511 |
| 2-naphthyl group | 356 | 379 | 399 | 415 | 433 | 478 | 452 | 475 | 487 | 498 | 508 |
| 1-anthracenyl group | 423 | 433 | 452 | 456 | 473 | 488 | 502 | 515 | 527 | 526 | 536 |
| 2-phenanthrenyl group | 378 | 396 | 414 | 428 | 443 | 458 | 472 | 485 | 497 | 508 | 518 |
| 3-phenanthrenyl group | 371 | 390 | 408 | 426 | 441 | 456 | 455 | 468 | 480 | 491 | 501 |
| 9-phenanthrenyl group | 367 | 384 | 403 | 420 | 434 | 449 | 463 | 476 | 488 | 499 | 509 |

Specific examples of the polyene compound for use in the recording layer of the optical information recording medium according to the present invention are as follows.

In each structural formula, n shown in the general formula represents an integer of 2 to 12 corresponding to Table 1.

TABLE 2

| Dye No. | Compound |
|---|---|
| 10001 | 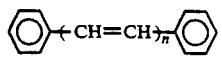 |
| | Diphenylpolyene    (n = 1) $C_{14}H_{12}$ (180) |

TABLE 2-continued

| Dye No. | Compound | |
|---|---|---|
| 10002 | " | (n = 2) $C_{16}H_{14}$ (206) |
| 10003 | " | (n = 3) $C_{18}H_{16}$ (232) |
| 10004 | " | (n = 4) $C_{20}H_{18}$ (258) |
| 10005 | " | (n = 5) $C_{22}H_{20}$ (284) |
| 10006 | " | (n = 6) $C_{24}H_{22}$ (310) |
| 10007 | " | (n = 7) $C_{26}H_{24}$ (336) |

10101

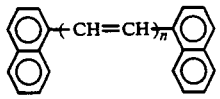

| | 1,1'-binaphthylpolyene | (n = 1) $C_{22}H_{16}$ (280) |
|---|---|---|
| 10102 | " | (n = 2) $C_{24}H_{18}$ (306) |
| 10103 | " | (n = 3) $C_{26}H_{20}$ (332) |
| 10104 | " | (n = 4) $C_{28}H_{22}$ (358) |
| 10105 | " | (n = 6) $C_{32}H_{26}$ (410) |

10111

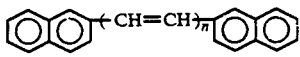

| | 2,2'-binaphthylpolyene | (n = 1) $C_{22}H_{16}$ (280) |
|---|---|---|
| 10112 | " | (n = 2) $C_{24}H_{18}$ (306) |
| 10113 | " | (n = 3) $C_{26}H_{20}$ (332) |
| 10114 | " | (n = 4) $C_{28}H_{22}$ (358) |
| 10115 | " | (n = 5) $C_{30}H_{24}$ (384) |
| 10116 | " | (n = 6) $C_{32}H_{26}$ (410) |

10201

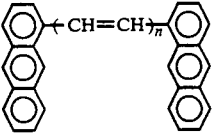

| | 1,1'-bianthracenylpolyene | (n = 1) $C_{30}H_{20}$ (380) |
|---|---|---|
| 10202 | " | (n = 2) $C_{32}H_{22}$ (406) |
| 10203 | 1,1'-bianthracenylpolyene | (n = 3) $C_{34}H_{24}$ (432) |
| 10204 | " | (n = 4) $C_{36}H_{26}$ (458) |
| 10205 | " | (n = 5) $C_{38}H_{28}$ (484) |
| 10206 | " | (n = 6) $C_{40}H_{30}$ (510) |

10301

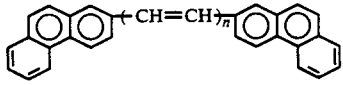

| | 2,2'-biphenanthrenylpolyene | (n = 1) $C_{30}H_{20}$ (380) |
|---|---|---|
| 10302 | " | (n = 2) $C_{32}H_{22}$ (406) |
| 10303 | " | (n = 3) $C_{34}H_{24}$ (432) |
| 10304 | " | (n = 4) $C_{36}H_{26}$ (458) |
| 10305 | " | (n = 5) $C_{38}H_{28}$ (484) |
| 10306 | " | (n = 6) $C_{40}H_{30}$ (510) |

10311

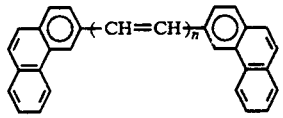

| | 3,3'-biphenanthrenylpolyene | (n = 1) $C_{30}H_{20}$ (380) |
|---|---|---|
| 10312 | " | (n = 2) $C_{32}H_{22}$ (406) |
| 10313 | " | (n = 3) $C_{34}H_{24}$ (432) |
| 10314 | " | (n = 4) $C_{36}H_{26}$ (458) |
| 10315 | " | (n = 5) $C_{38}H_{28}$ (484) |
| 10316 | " | (n = 6) $C_{40}H_{30}$ (510) |

10321

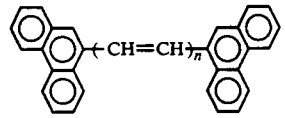

| | 9,9'-biphenanthrenylpolyene | (n = 1) $C_{30}H_{20}$ (380) |
|---|---|---|
| 10322 | " | (n = 2) $C_{32}H_{22}$ (406) |

TABLE 2-continued

| Dye No. | Compound | |
|---|---|---|
| 10323 | " | (n = 3) $C_{34}H_{24}$ (432) |
| 10324 | 9,9'-biphenanthrenylpolyene | (n = 4) $C_{36}H_{26}$ (458) |
| 10325 | " | (n = 5) $C_{38}H_{28}$ (484) |
| 10326 | " | (n = 6) $C_{40}H_{30}$ (510) |

The optical information recording medium of the present invention basically comprises a substrate and a recording layer. Further, the optical information recording medium may further comprise an undercoat layer, a protective layer, and/or a light reflecting layer when necessary as will be explained in detail later. In addition, it is possible to provide a conventionally known air-sandwich structure in which two recording layers are inwardly disposed so as to face each other.

In the present invention, information is recorded on the recording layer as a result of changes optically produced by the application of a laser beam. It is necessary that any of the previously mentioned dyes for use in the present invention be contained in the recording layer. Two or more dyes for use in the present invention may also be used in combination in the formation of the recording layer. These dyes can also be used by blending and dispersion or can be formed in laminations with other dyes such as phthalocyanine dyes, tetrahydrocholine dyes, dioxazine dyes, triphenothiazine dyes, phenanthrene dyes, cyanine dyes, merocyanine dyes, naphthoquinone dyes, anthraquinone dyes, indanthrene dyes, xanthene dyes, triphenylmethane dyes other than the above-mentioned dyes for use in the present invention, croconium dyes, pyrylium dyes, and azulene dyes, or metals and metal compounds such as In, Sn, Te, Bi, Al, Se, $TeO_2$, SnO, As, and Cd.

The dyes for use in the present invention may also be used by blending and dispersion in various types of materials such as high molecular materials, for example, ionomer resins, polyamide resins, vinyl resins, natural high polymers, silicone, liquid rubber, or in silane-coupling agents, or, with the object of improving the characteristics, may be used together with a stabilizer such as a transition metal complex, a dispersing agent, a flame retardant, a lubricant, an antistatic agent, a surfactant, or a plasticizer.

The structure of an optical information recording medium of the present invention will now be explained with reference to the drawing.

As shown in FIG. 1, the optical information recording medium of the present invention basically comprises a recording layer 2, containing the dye for use in the present invention, on a substrate 1. The recording layer 2 can be formed, in an optional order, as two layers—a light reflecting layer and a light absorbing layer.

The recording layer can be formed by a conventional means such as vacuum deposition, sputtering, CVD (chemical vapor deposition), or by coating in the form of a liquid. In the case where the liquid coating method is used, the dye for use in the present invention and other components are dissolved in an organic solvent, and the solution is applied by a conventional coating method such as spraying, roller coating, dipping, spinning, or the like. Examples of the organic solvent include alcohols such as methanol, ethanol and isopropanol; ketones such as acetone, methyl ethyl ketone, and cyclohexanone; amides such as N, N'-dimethylformamide, and N,N-dimethylacetoamide; sulfoxides such as dimethylsulfoxide; ethers such as tetrahydrofurane, dioxane, and ethylene glycol monomethyl ether; esters such as methyl acetate, and ethyl acetate; aliphatic halogenated hydrocarbons such as chloroform, methylene chloride, dichloroethane, carbon tetrachloride, and trichloroethane; the like; and aromatic hydrocarbons such as benzene, toluene, xylene, ligroin, monochlorobenzene, and dichlorobenzene.

It is preferable that the recording layer have a thickness of 100Å to 10 μm, more preferably 200Å to 1000Å. It is also preferable that the recording layer have a reflectance of at least 15% from the substrate side for recording and reproduction.

The substrate 1 must be transparent with respect to the laser beam used in the case where recording and reproduction are performed from the substrate side, but need not be transparent if recording and reproduction are performed from the recording layer side. For the substrate, materials, for example, glass; plastics such as polyester, polyamide, polyolefin, polycarbonate, epoxy, polyimide, and polymethylmethacrylate; metals, and ceramics are usually used, but any substrate which can be used with other recording media is also acceptable.

As shown in FIG. 2 to FIG. 6, in addition to the recording layer 2 as shown in FIG. 1, an undercoat layer 3, and/or a protective layer 4, and/or a reflecting layer 5 can also be provided. In such a case, the dyes for use in the present invention represented by the previously mentioned formula may be contained in the undercoat layer and/or in the protective layer.

Figure 2:
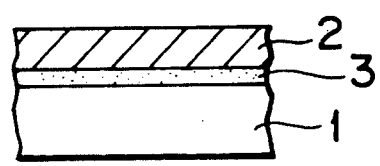

More specifically, in the optical information recording medium shown in FIG. 2, the undercoat layer 3 is interposed between the substrate 1 and the recording layer 2. The use of the undercoat layer 3 has as objects, for instance: (a) to improve the adhesion between the substrate 1 and the recording layer 2; (b) to act as a moisture or gas barrier for the recording layer 2; (c) to improve the storage stability of the recording layer 2; (d) to improve the reflectance of the recording medium; (e) to protect the substrate from solvents; and (f) to form pregrooves.

The object of (a) can be achieved by the use of the previously mentioned polymeric materials and silane coupling agents, and the like employed in the recording layer 2.

The objects of (b) and (c) can be achieved by the use of, in addition to the polymeric materials, an inorganic compound such as $SiO_2$, $MgF_2$, SiO, $TiO_2$, ZnO, TiN and SiN, a metal or semimetal such as Zn, Cu, S, Ni, Cr, Ge, Se, Cd, Ag, and Al.

The object of (d) can be achieved by use of a thin film layer made of a metal such as Au, Al and Ag, or an organic thin film layer with a metallic brilliance, comprising, for example, a methine dye, xanthene dye, and the like.

The objects of (e) and (f) can be achieved by use of an ultraviolet-curing resin, a thermosetting resin, a thermoplastic resin, and the like.

It is preferable that the undercoat layer 3 have a thickness of 0.01 μm to 30 μm, more preferably 0.05 μm to 10 μm.

Figure 3:
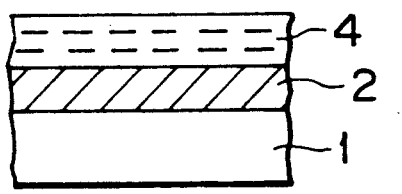
Figure 4:
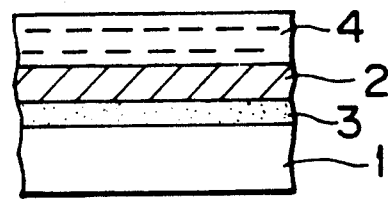

The protective layer 4 is provided on the recording layer 2 as shown in FIG. 3 and FIG. 4.

The protective layer 4 has the objective of protecting the recording layer 2 from scratches, dust, soiling, and the like, as well as improving the chemical stability of the recording layer 2. The materials which can be used for the protective layer are the same as for the undercoat layer. It is preferable that the protective layer 4 have a thickness of 0.1 μm or more, more preferably 50 μm or more.

Figure 5:
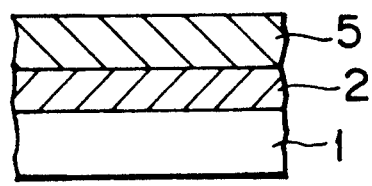
Figure 6:
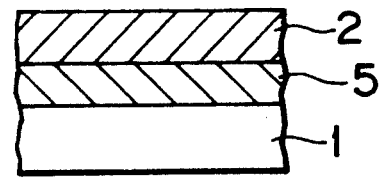

As shown in FIG. 5, the reflecting layer 5 can be provided on the recording layer 2. Alternatively, the reflecting layer 5 can be interposed between the substrate 1 and the recording layer 3.

The reflecting layer 5 can be made of a thin film layer made of a metal such as Al, Ag, Au, Pt, Pd, and Cu, or an organic thin film layer with a metallic brilliance, comprising, for example, a methine dye, a xanthene dye, a squaylium dye, or a dielectric thin film layer. When necessary, the above-mentioned protective layer 4 may be provided on the reflecting layer 5.

Other configurations which may be used for the optical information recording medium of the present invention are the so-called air sandwich configuration, wherein two of the recording media shown in FIG. 1 to FIG. 4 are used, with the recording layers 2 thereof being inwardly directed to each other, or by using one of the two recording media as a substrate depending upon the case, hermetically sealed, and the glued sandwich configuration which is glued through the protective layer 4.

In the recording of information, the laser beam is focused through a lens to form minute holes (pits) in the recording layer. The information is read out by directing a relatively weak laser beam onto the recording layer and utilizing the difference in reflectance between the pit sections and the other sections. Using a secondary higher harmonic of a semiconductor laser with a wavelength of 750 nm to 850 nm as a laser beam source makes it possible to reduce the size of a recording and reproduction apparatus for use with the optical information recording medium of the present invention.

The features of this invention will become apparent in the course of the following description of exemplary embodiment which is given for illustration of the invention and is not intended to be limiting thereof.

EXAMPLE

A one wt. % tetrahydrofuran solution of of a dye with a formula of

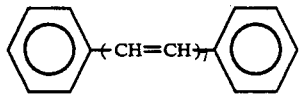

was applied to a 1.15 mm thick glass substrate by a spinner and dried, so that a recording layer with a thickness of 0.05 μm was formed on the glass substrate. Thus, an optical information recording medium according to the present invention was fabricated.

A laser beam with a wavelength of 458 nm was applied to this recording medium. The reflectivity of the recording layer of this recording medium was 20%, and recording information by an Ar laser beam was satisfactorily carried out.

According to the present invention, by use of the particular polyene compounds as mentioned previously in the recording layer, the information recording medium has a significantly large optical absorption capability at a wavelength in the 400 nm to 500 nm range, and a log (atomic light absorption coefficient) of about 5.0. As a result, the recording medium of the present invention has superior recording characteristics with respect to a laser beam with a wavelength in the 400 nm to 500 nm range, so that high density recording is possible.

What is claimed is:

1. An optical information recording medium comprising a substrate and a recording layer capable of producing optical changes therein by the application of a focused laser beam which comprises a diarylpolyene compound, represented by general formula (I):

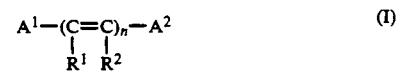

wherein $A^1$ and $A^2$ each represent an aryl group which may have a substituent and may be the same or different; $R^1$ and $R^2$ each represent hydrogen, a halogen or an alkyl group having 1 to 4 carbon atoms; and n is an integer of 2 or more.

2. The optical information recording medium as claimed in claim 1, wherein said aryl group represented by $A^1$ and $A^2$ is selected from the group consisting of a phenyl group, a naphthyl group, an anthracenyl group, and a phenanthrenyl group, which may have a substituent selected from the group consisting of a halogen, and an alkyl group having 1 to 4 carbon atoms.

3. The optical information recording medium as claimed in claim 1, wherein said alkyl group represented by $R^1$ and $R^2$ is selected from the group consisting of a methyl group and an ethyl group.

4. The optical information recording medium as claimed in claim 1, wherein said recording layer further comprises a dye selected from the group consisting of phthalocyanine dyes, tetrahydrocholine dyes, dioxazine dyes, triphenothiazine dyes, phenanthrene dyes, cyanine dyes, merocyanine dyes, naphthoquinone dyes, anthraquinone dyes, indanthrene dyes, xanthene dyes, and triphenylmethane dyes.

5. The optical information recording medium as claimed in claim 1, wherein said recording layer further comprises a dye selected from the group consisting of croconium dyes, pyrylium dyes, and azulene dyes.

6. The optical information recording medium as claimed in claim 1, wherein said recording layer further comprises a metal or metal compound selected from the group consisting of In, Sn, Te, Bi, Al, Se, $TeO_2$, SnO, As, and Cd.

7. The optical information recording medium as claimed in claim 1, wherein said recording layer has a thickness of 100Å to 10 μm.

8. The optical information recording medium as claimed in claim 1, wherein said recording layer has a reflectance of at least 15% from the side of said substrate.

9. The optical information recording medium as claimed in claim 1, further comprising an undercoat layer which is interposed between said substrate and said recording layer.

10. The optical information recording medium as claimed in claim 9, wherein said undercoat layer comprises said diarylpolyene compound of formula (I).

11. The optical information recording medium as claimed in claim 9, wherein said undercoat layer has a thickness of 0.01 μm to 30 μm.

12. The optical information recording medium as claimed in claim 1, further comprising a protective layer which is provided on said recording layer.

13. The optical information recording medium as claimed in claim 12, wherein said protective layer has a thickness of 0.1 μm or more.

14. The optical information recording medium as claimed in claim 1, further comprising a reflecting layer which is provided on said recording layer.

15. The optical information recording medium as claimed in claim 14 wherein said reflecting layer is a metal thin film layer comprising a metal selected from the group consisting of Al, Ag, Au, Pt, Pd, and Cu.

16. The optical information recording medium as claimed in claim 14, wherein said reflecting layer is an organic thin film layer comprising an organic dye selected from the group consisting of a methine dye, a xanthene dye and a squarylium dye.

17. The optical information recording medium as claimed in claim 14, wherein said reflecting layer is a dielectric thin film layer.

18. The optical information recording medium as claimed in claim 1, further comprising a reflecting layer which is interposed between said substrate and said recording layer.

19. The optical information recording medium as claimed in claim 18, wherein said reflecting layer is a metal thin film layer comprising a metal selected from the group consisting of Al, Ag, Au, Pt, Pd, and Cu.

20. The optical information recording medium as claimed in claim 18, wherein said reflecting layer is an organic thin film layer comprising an organic dye selected from the group consisting of a methine dye, a xanthene dye and a squarylium dye.

21. The optical information recording medium as claimed in claim 18, wherein said reflecting layer is a dielectric thin film layer.

* * * * *